(12) United States Patent
Wei

(10) Patent No.: US 10,371,473 B1
(45) Date of Patent: Aug. 6, 2019

(54) MAGAZINE STRUCTURE FOR A TOY GUN

(71) Applicant: Ho-Sheng Wei, New Taipei (TW)

(72) Inventor: Ho-Sheng Wei, New Taipei (TW)

(*) Notice: Subject to any disclaimer, the term of this patent is extended or adjusted under 35 U.S.C. 154(b) by 0 days.

(21) Appl. No.: 16/001,936

(22) Filed: Jun. 7, 2018

(51) Int. Cl.
| | |
|---|---|
| *F41B 11/00* | (2013.01) |
| *F41A 9/76* | (2006.01) |
| *B65G 23/06* | (2006.01) |
| *F41B 11/89* | (2013.01) |
| *F41B 11/57* | (2013.01) |
| *F41B 11/50* | (2013.01) |

(52) U.S. Cl.
CPC ............ *F41A 9/76* (2013.01); *B65G 23/06* (2013.01); *F41B 11/50* (2013.01); *F41B 11/57* (2013.01); *F41B 11/89* (2013.01)

(58) Field of Classification Search
CPC .. F41A 9/76; F41B 11/50; F41B 11/54; F41B 11/57
See application file for complete search history.

(56) References Cited

U.S. PATENT DOCUMENTS

| | | | | |
|---|---|---|---|---|
| 2,237,678 A * | 4/1941 | Lohr | .............. | F41A 9/28 124/44.7 |
| 4,468,875 A * | 9/1984 | Harrison | .............. | F41A 9/76 42/50 |
| 4,986,251 A * | 1/1991 | Lilley | .............. | F41B 11/54 124/48 |
| 5,592,931 A * | 1/1997 | Johnson | .............. | F41B 11/54 124/48 |
| 6,467,473 B1* | 10/2002 | Kostiopoulos | .............. | F41B 11/57 124/51.1 |
| 6,530,368 B1* | 3/2003 | Maeda | .............. | F41B 11/55 124/48 |
| 6,736,125 B2* | 5/2004 | Petrosyan | .............. | F41B 11/55 124/51.1 |
| 6,796,300 B2* | 9/2004 | Petrosyan | .............. | F41B 11/55 124/48 |
| 7,270,121 B2* | 9/2007 | Lubben | .............. | F41B 11/53 124/51.1 |
| 7,765,997 B2* | 8/2010 | Klockener | .............. | F41A 9/76 124/48 |
| 9,022,015 B2* | 5/2015 | Tseng | .............. | F41A 9/70 124/51.1 |
| 9,612,081 B2* | 4/2017 | Maeda | .............. | F41B 11/55 |
| 2011/0253119 A1* | 10/2011 | Cho | .............. | F41B 11/54 124/41.1 |

* cited by examiner

*Primary Examiner* — John A Ricci
(74) *Attorney, Agent, or Firm* — Chun-Ming Shih; HDLS IPR Services

(57) ABSTRACT

A magazine structure for a toy gun includes a carrier (10), an active gear (20), a passive gear (30) and a loading chain (40). The active gear (20) is rotatably installed to the carrier (10). The passive gear (30) is rotatably installed to the carrier (10) and arranged at an interval with the active gear (20). The loading chain (40) surrounds the active gear (20) and the passive gear (30) and has hollow cylinders (41) and a strap (42) connecting the hollow cylinders (41).

10 Claims, 6 Drawing Sheets

MAGAZINE STRUCTURE FOR A TOY GUN

BACKGROUND OF THE INVENTION

1. Technical Field

The invention relates to toy gun technology, particularly to a magazine structure for a toy gun.

2. Related Art

With divergent development of life, some people choose recreation to relieve pressure, and some people choose exciting activities for recreation. Thus, toy guns such as BB guns, paint guns and air guns have become important recreational activities.

Currently available toy guns have various types of bullet loading mechanisms. One of them is a bullet belt storing bullets and uses a roller to propel the bullet belt. A drawback of such a mechanism is that the roller cannot accurately propel the bullet strap. As a result, malfunction such as jamming often occurs because a bullet cannot align with a barrel.

SUMMARY OF THE INVENTION

An object of the invention is to provide a magazine structure for a toy gun, which can make accurately positioning to propelling of bullets by cooperation of the active and passive gears and the loading chain.

To accomplish the above object, the invention provides a magazine structure for a toy gun, which includes a carrier, an active gear, a passive gear and a loading chain. The active gear is rotatably installed to the carrier. The passive gear is rotatably installed to the carrier and arranged at an interval with the active gear. The loading chain surrounds the active gear and the passive gear and has hollow cylinders and a strap connecting the hollow cylinders.

The invention further has the following functions. Because two ends of the active and passive gears connect to the carrier, the arrangement of the active and passive gears is more stable and firmer. By the teeth match with the hollow cylinders and straps in outline, a precision positioning effect to propelling of bullets during operation can be can provided. The intermediate gear can not only assist the loading chain to shift, but also increase reliability of shift of loading chain. By the transmission belt, rotation of the active and passive gears can be more stable.

DETAILED DESCRIPTION OF THE INVENTION

Figure 1:
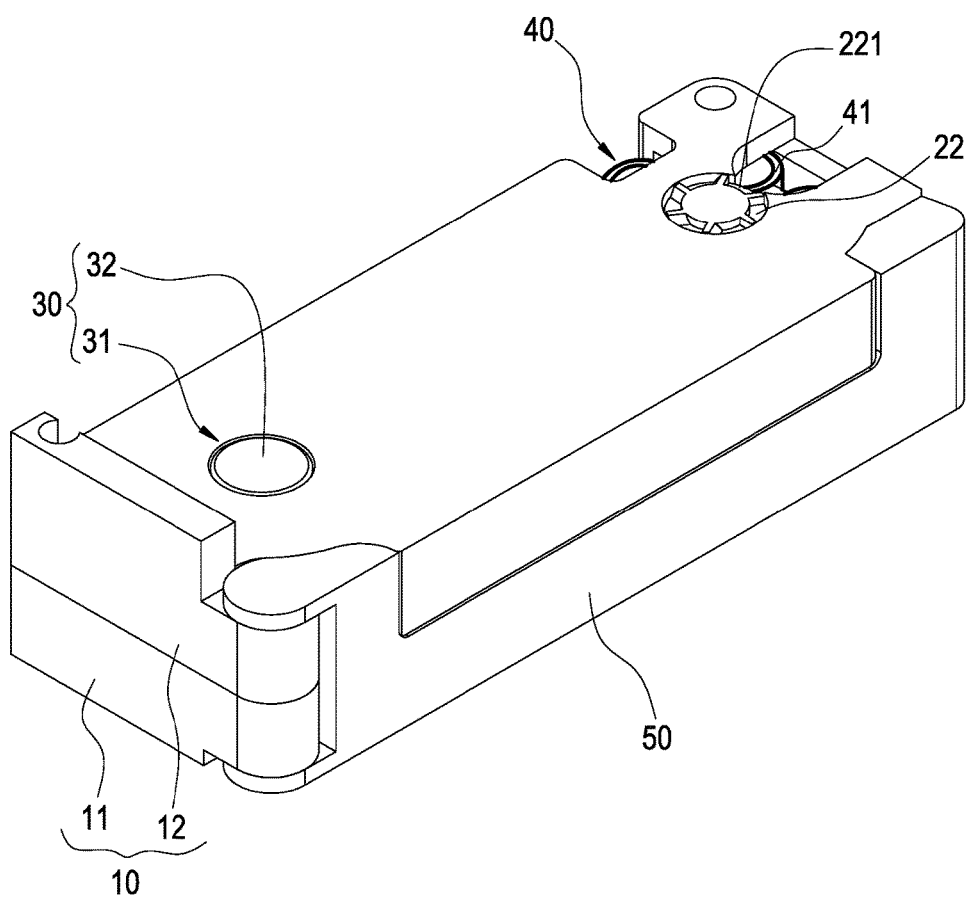
FIG. 1 is a perspective view of the invention.
Figure 2:
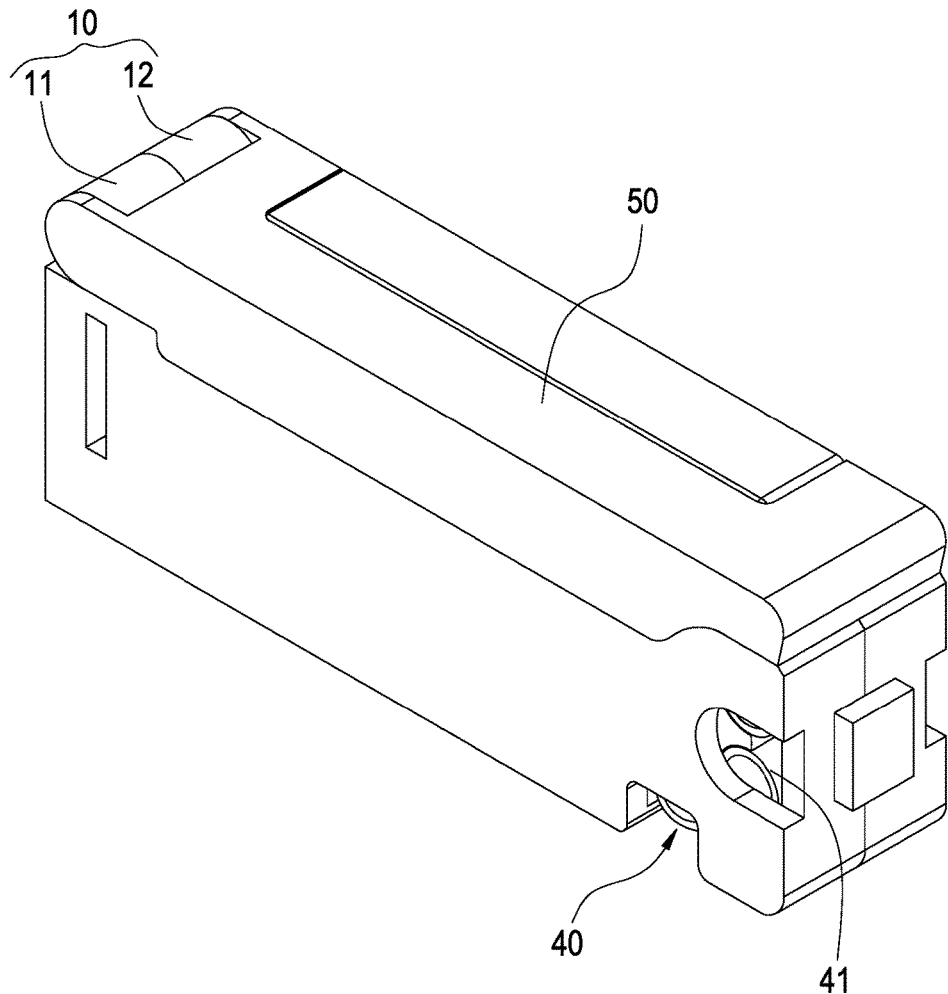
FIG. 2 is another perspective view of the invention.
Figure 3:
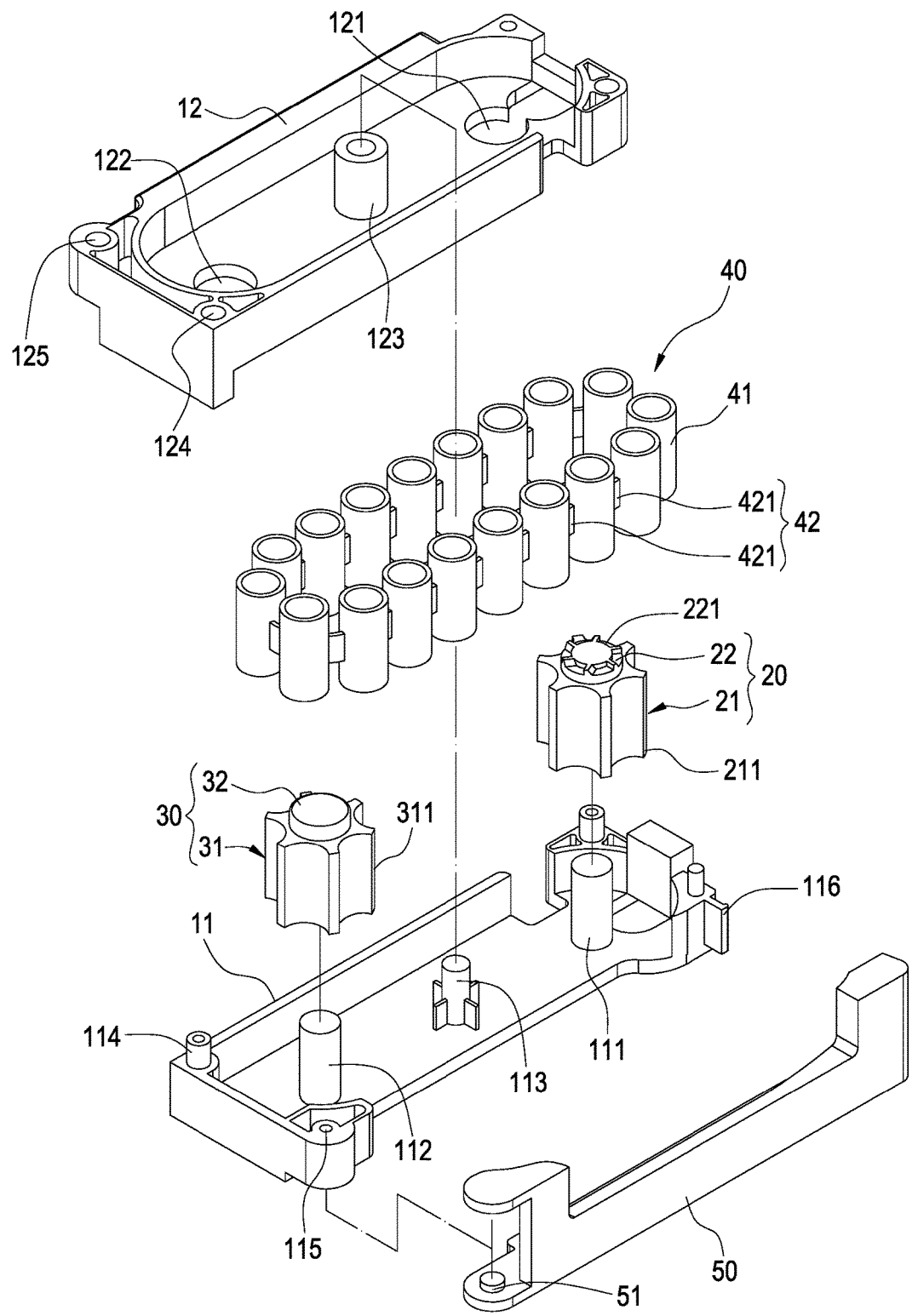
FIG. 3 is an exploded view of the invention.
Figure 4:
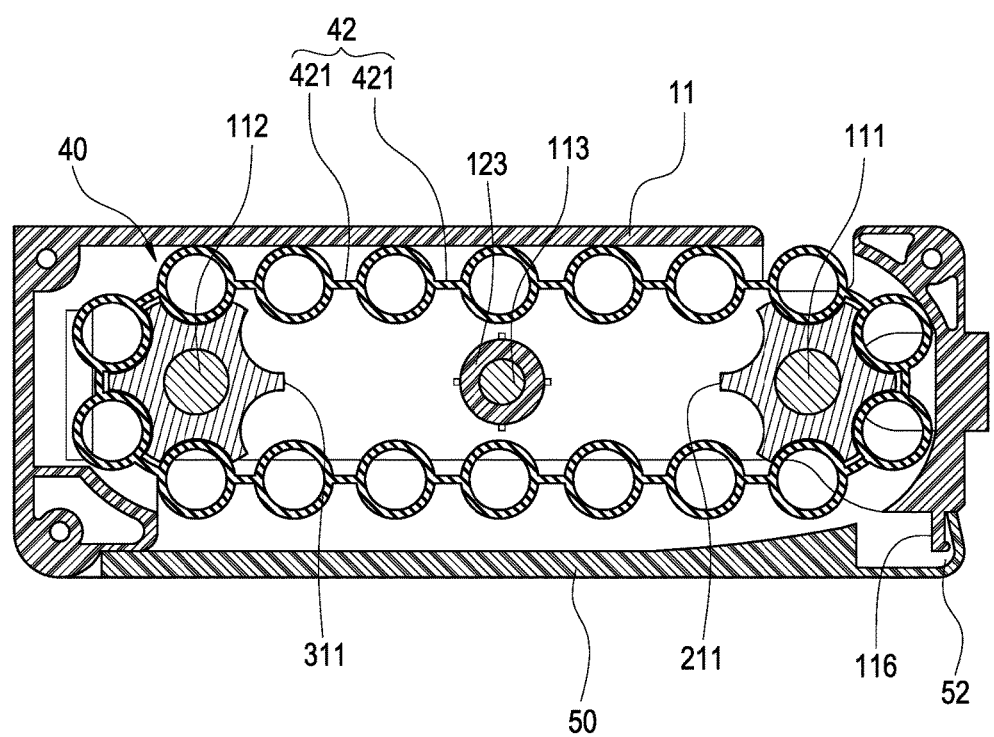
FIG. 4 is a cross-sectional view of the invention.
Figure 5:
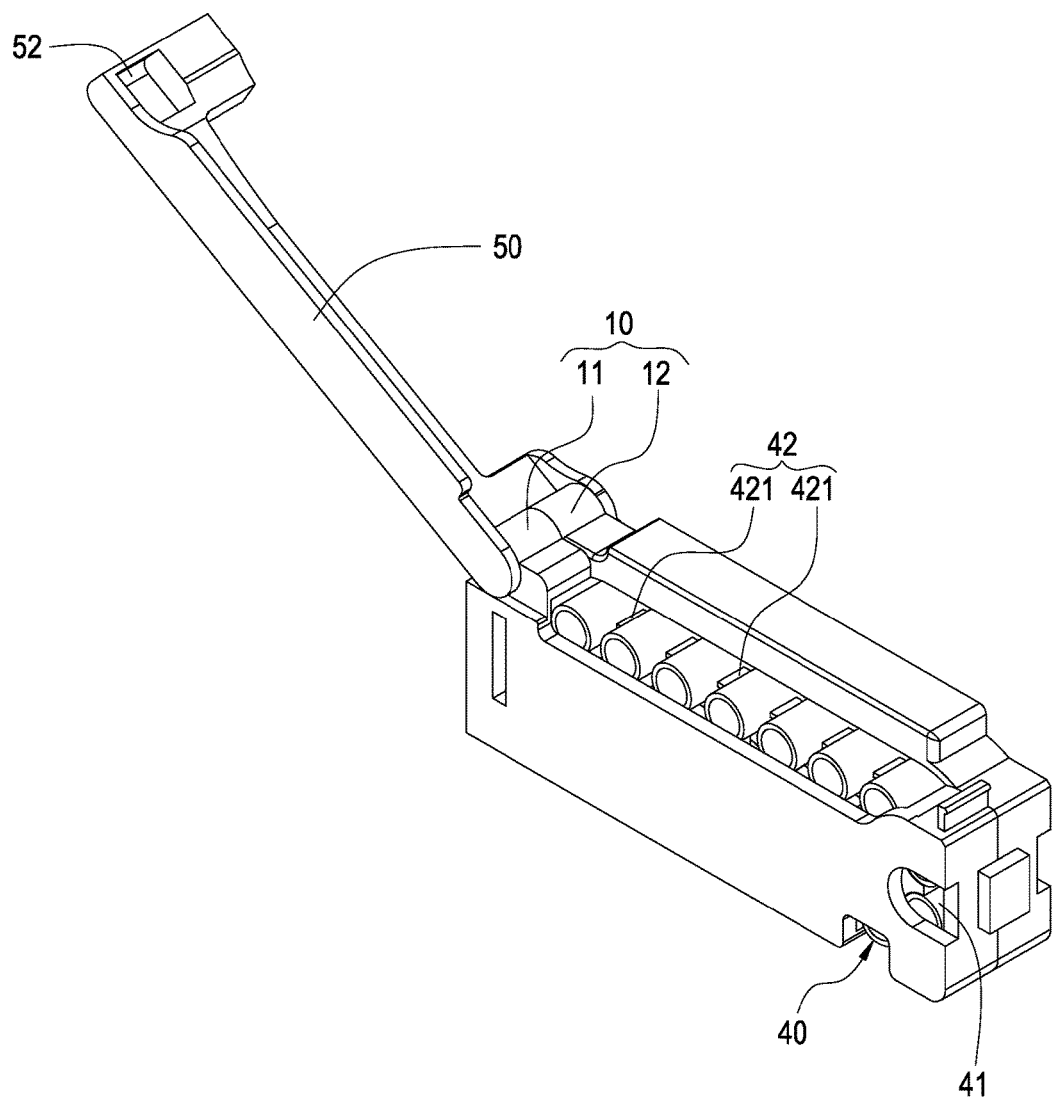
FIG. 5 is a schematic view of the invention when the cap is opened.

Please refer to FIGS. 1-5. The invention provides a magazine structure for a toy gun, which includes a carrier 10, an active gear 20, a passive gear 30 and a loading chain 40.

The carrier 10 of the embodiment is a rectangular box including a lower box 11 and an upper box 12. Two sides of the lower box 11 are separately extended with a front pivoting rod 111 and a rear pivoting rod 112. A positioning rod 113 is provided between the front and rear pivoting rods 111, 112. Corners of the lower box 11 are formed with a set of connecting rods 114. One of the corners is formed with a lower pivot hole 115 and another one of the corners is outward extended with an engaging board 116.

The upper box 12 correspondingly combines with the lower box 11. The upper box 12 is formed with a front hole 121 and a rear hole 122, which separately correspond to the front pivoting rod 111 and the rear pivoting rod 112. The upper box 12 is further formed with a sleeve 123 corresponding to the positioning rod 113 for receiving the positioning rod 113. The upper box 12 is formed with connecting holes 124 separately corresponding to the connecting rods 114 for correspondingly receiving the connecting rods 114. Also, the upper box 12 is formed with an upper pivot hole 125 corresponding to the lower pivot hole 115.

The active gear 20 is rotatably installed to the carrier 10 and formed in between the upper box 12 and the lower box 11. The active gear 20 includes a gear portion 21 and driven portion 22. The gear portion 21 is axially passed by the front pivoting rod 111 and has teeth 211 which are annularly arranged. The driven portion 22 is formed on an end of the gear portion 21 and axially connected into the front hole 121. The top of the driven portion 22 is formed with recesses 221 for being driven by an acting gear (not shown) to rotate.

The passive gear 30 is also rotatably installed to the carrier 10 at an interval with the active gear 20. The passive gear 30 includes a gear portion 31 and an extended shaft 32. The gear portion 31 is axially passed by the rear pivoting rod 112 and has teeth 311 which are annularly arranged. The extended shaft 32 is upward formed on an end of the gear portion 31 and axially connected into the rear hole 122.

The loading chain 40 is made of rubber or plastic and surrounds the active gear 20 and the passive gear 30. The loading chain 40 has hollow cylinders 41 and a strap 42 connecting the hollow cylinders 41. Each hollow cylinder 41 is used for loading a bullet (not shown). The strap 42 in this embodiment is composed of sheets 421. Each sheet 421 is connected between two adjacent hollow cylinders 41.

Further, the invention includes a cap 50. Two ends of the cap 50 are provided with a pivot 51 and a hook 52, respectively. The pivot 51 is received in both the lower pivot hole 115 and the upper pivot hole 125. The hook 52 will engage with the engaging board 116 when the cap 50 is closed to the upper box 12 and the lower box 11.

When using, open the cap 50 first, load bullets into the hollow cylinders 41, and close the cap 50. When operating, the acting gear of a toy gun drives the recesses 221 of the active gear 20 to rotate. At this time, each tooth 211 of the active gear 20 is separately embedded into a room encompassed by two adjacent hollow cylinders 41 and the sheets 421 to drive the loading chain 40 and the passive gear 30 to rotate. Because an outline of the teeth 211 matches with those of the hollow cylinders 41 and the sheets 421, it can provide a precision positioning effect to propelling of bullets during operation.

Figure 6:
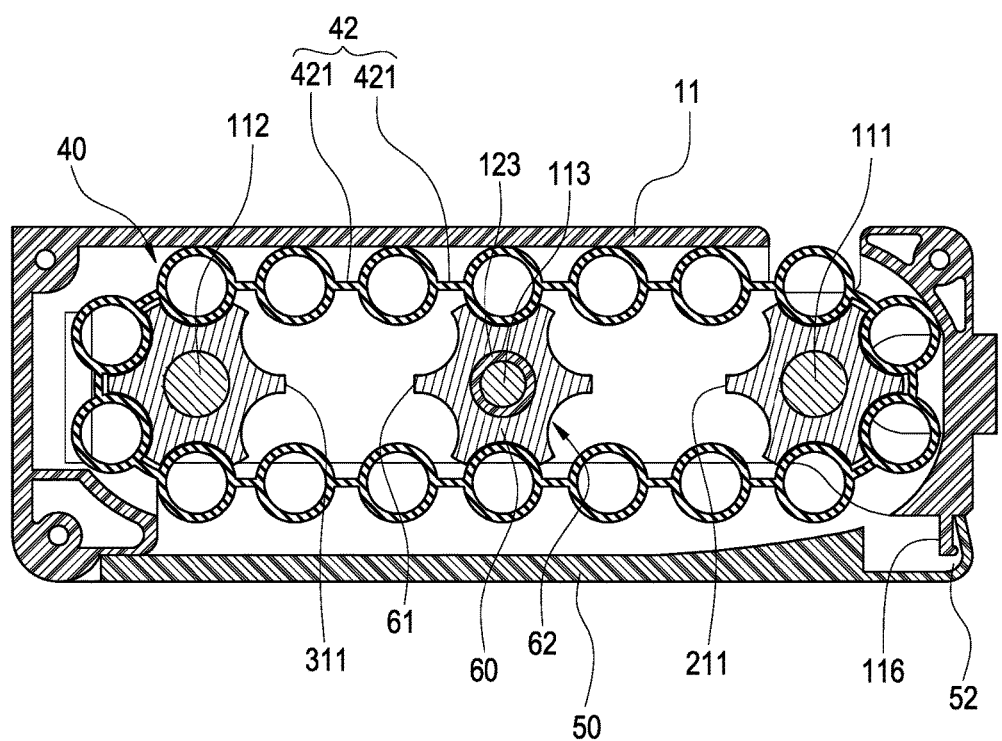
FIG. 6 is a cross-sectional view of another embodiment of the invention.

Please refer to FIG. 6, which shows another embodiment of the invention. This embodiment further includes an intermediate gear 60 axially connected to the sleeve 123 and having teeth 61 which are identical to the teeth 211, 311. A concave arc 62 is formed between two adjacent teeth 61. The concave arc 62 matches with an outline of the hollow cylinder 41 to engage. It can not only assist the loading chain 40 to shift, but also increase reliability of shift of loading chain 40.

It will be appreciated by persons skilled in the art that the above embodiments have been described by way of example only and not in any limitative sense, and that various alterations and modifications are possible without departure from the scope of the disclosed example as defined by the appended claims.

What is claimed is:

1. A magazine structure for a toy gun, comprising:
a carrier (10);
an active gear (20), rotatably installed to the carrier (10);
a passive gear (30), rotatably installed to the carrier (10), and arranged at an interval with the active gear (20); and
a loading chain (40), surrounding the active gear (20) and the passive gear (30), and having hollow cylinders (41) and a strap (42) connecting the hollow cylinders (41), wherein the strap (42) is composed of sheets (421), and each sheet (421) is connected between any two adjacent hollow cylinders (41).

2. The magazine structure for a toy gun of claim 1, wherein the active gear (20) comprises a gear portion (21) and a driven portion (22) formed on an end of the gear portion (21).

3. The magazine structure for a toy gun of claim 1, wherein the active gear (20) comprises a gear portion (21) and a driven portion (22) formed on an end of the gear portion (21), and a top of the driven portion (22) is formed with recesses (221).

4. The magazine structure for a toy gun of claim 1, wherein the passive gear (30) comprises a gear portion (31) and an extended shaft (32) extending from the gear portion (31).

5. The magazine structure for a toy gun of claim 1, wherein the carrier (10) is a rectangular box including a lower box (11) and an upper box (12).

6. The magazine structure for a toy gun of claim 5, wherein the lower box (11) are extended with a front pivoting rod (111) and a rear pivoting rod (112), the upper box (12) is formed with a front hole (121) corresponding to the front pivoting rod (111) and a rear hole (122) corresponding to the rear pivoting rod (112), the active gear (20) is axially connected to the front pivoting rod (111) and the front hole (121), and the passive gear (30) is axially connected to the rear pivoting rod (112) and the rear hole (122).

7. The magazine structure for a toy gun of claim 6, wherein a positioning rod (113) is provided between the front and rear pivoting rods (111, 112), the upper box (12) is formed with a sleeve (123) for receiving the positioning rod (113).

8. The magazine structure for a toy gun of claim 5, wherein corners of the lower box (11) are formed with a set of connecting rods (114), and the upper box (12) is formed with connecting holes (124) for correspondingly receiving the connecting rods (114).

9. A magazine structure for a toy gun, comprising:
a carrier (10);
an active gear (20), rotatably installed to the carrier (10);
a passive gear (30), rotatably installed to the carrier (10), and arranged at an interval with the active gear (20);
a loading chain (40), surrounding the active gear (20) and the passive gear (30), and having hollow cylinders (41) and a strap (42) connecting the hollow cylinders (41); and
a cap (50), two ends of the cap (50) being provided with a pivot (51) and a hook (52), respectively, and the hook (52) engages with an engaging board (116) extending from the carrier (10).

10. A magazine structure for a toy gun, comprising:
a carrier (10);
an active gear (20), rotatably installed to the carrier (10);
a passive gear (30), rotatably installed to the carrier (10), and arranged at an interval with the active gear (20); and
a loading chain (40), surrounding the active gear (20) and the passive gear (30), and having hollow cylinders (41) and a strap (42) connecting the hollow cylinders (41), wherein an intermediate gear (60) is axially connected to a sleeve (123) of the carrier (10) and has teeth (61), a concave arc (62) is formed between two adjacent teeth (61), and the concave arc (62) matches with an outline of the hollow cylinder (41) to engage.

* * * * *